(12) United States Patent
Chen et al.

(10) Patent No.: US 7,864,387 B2
(45) Date of Patent: Jan. 4, 2011

(54) COLOR REPRODUCTION ERROR MINIMIZATION METHOD AND DEVICE

(75) Inventors: Yongda Chen, Pittsford, NY (US); Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 299 days.

(21) Appl. No.: 11/777,689

(22) Filed: Jul. 13, 2007

(65) Prior Publication Data

US 2009/0015888 A1    Jan. 15, 2009

(51) Int. Cl.
*G03F 3/08* (2006.01)
*H04N 1/405* (2006.01)
*H04N 1/46* (2006.01)
*G06K 9/00* (2006.01)

(52) U.S. Cl. ............... 358/518; 358/3.04; 358/525; 382/167

(58) Field of Classification Search ............... None
See application file for complete search history.

(56) References Cited

U.S. PATENT DOCUMENTS

| | | | | |
|---|---|---|---|---|
| 6,377,366 | B1* | 4/2002 | Usami | 358/520 |
| 6,833,937 | B1* | 12/2004 | Cholewo | 358/518 |
| 7,057,765 | B1* | 6/2006 | Fischer et al. | 358/1.9 |
| 7,505,625 | B2* | 3/2009 | Haikin | 382/167 |
| 2005/0071104 | A1* | 3/2005 | Viturro et al. | 702/85 |
| 2005/0248783 | A1* | 11/2005 | Tin | 358/1.9 |

OTHER PUBLICATIONS

Marcu, G., "Gamut Mapping in Munsell Constant Hue Sections," IS&T/SID Sixth Color Imaging Conference: Color Science, Systems and Applications, Scottsdale, AZ; Nov. 1998, pp. 159-162.
Tastl, I., et al., "ICC Color Management and CIECAM02," Thirteenth Color Imaging Conference, Scottsdale, AZ, Nov. 2005, vol. 13, pp. 217-223.
Moroney, N., "Assessing hue constancy using gradients," Color Imaging: Device Independent Color, Color Hardcopy, and Graphic Arts V, Proceedings of SPIE, vol. 3963, pp. 294-300.
Cholewo, T. J., et al., "Gamut Boundary Determination Using alpha-shapes," IS7T/SID Seventh Color Imaging Conference: Color Science, Systems and Applications, Scottsdale, AZ, Nov. 1999, vol. 7, pp. 200-204.
Cholewo, T. J., "Printer Model Inversion by Constrained Optimization," Color Imaging: Device Independent Color, Color Hardcopy, and Graphic Arts V, Proceedings of SPIE, vol. 3963, San Jose, CA, 2000, pp. 349-357.
Cholewo, T. J., "Conversion between CMYK Spaces Preserving Black Separation," Eighth Color Imaging Conference: Color Science and Engineering Systems, Technologies, Applications, Scottsdale, AZ, 2000, pp. 257-261.
Stanford Science Psych Project Report "Printer Calibration," Apr. 16, 1999, pp. 1-5.
Rao, P., et al., "Art-si.org art spectral imaging," Performance Evaluation of the Profile Maker Professional 5.0 ICC Profiling Software, Munsell Color Science Laboratory, Chester F. Carlson Center for Imaging Science, Rochester Institute of Technology, Jan. 2005, pp. 1-44.

* cited by examiner

*Primary Examiner*—Twyler L Haskins
*Assistant Examiner*—Barbara D Reinier
(74) *Attorney, Agent, or Firm*—Oliff & Berridge, PLC

(57) ABSTRACT

Mapping an input color space into a colorimetric subspace can generate a target colorimetry space. Initial device color values can be used to generate an initial reference colorimetry space. A penalty error between the target colorimetry space and the reference colorimetry space can be minimized by generating a next reference colorimetry space based on subsequent device colors.

23 Claims, 5 Drawing Sheets

COLOR REPRODUCTION ERROR MINIMIZATION METHOD AND DEVICE

BACKGROUND

Good color reproduction by a marking device requires accurate color maps in the marking device. A marking device's color reproduction errors show up in the colorimetry of its output. Colorimetry is the science of color measurement using standard models of human color perception.

A marking device may be required to use process colors to approximate input colors, such as spot colors. Spot colors are fundamentally different from process colors. Each spot color is printed with a specific colorant or ink. In contrast, process colors are combinable colors; they are overlaid or mixed to achieve a desired color. The process colors a marking device uses are called device colors.

A marking device that uses process colors may not be able to reproduce colors with good colorimetric accuracy. Input colors that are out of a marking device's color range can be referred to as "out-of-gamut." The marking device will exhibit measured colorimetry errors when outputting either out-of-gamut or in-gamut colors.

A marking device may or may not map input colors directly to a colorimetric set or space. A marking device may use an intermediate color space to map an input color space to a colorimetric space. The marking device can map an input color space to the intermediate color space then to the colorimetric space. The intermediate color space provides a touch-stone so color reproduction can be device-independent.

The International Color Consortium (ICC) has defined and standardized a device-independent intermediate color space called the profile connection space (PCS). The ICC defines profiles that use specific data structures to standardize how color is managed by displays and marking devices. ICC profiles contain numerous smaller data strictures called tags. Some tags quantify a marking device's gamut and determine how it is used while other tags hold maps or lookup tables between color spaces.

Existing color reproduction methods use maps that contain errors. Color maps can be produced when a marking device's ICC profile is updated, such as when a printer is calibrated at the factory or at a customer location. Because of the perceptual inhomogeneity of colorimetric space, color mapping errors may be difficult to avoid using standard printer calibration methods. Errors in color maps can increase as the marking characteristics or status of a marking device shifts. Erroneous color maps can also be produced when colorimetric measurements contain error. Color mapping errors can exceed human perceptual thresholds when printing spot colors or calibrating a printer and can be objectionable.

SUMMARY

Mapping an input color space into a colorimetric subspace can generate a target colorimetry space. The input color space can be CIE L*a*b* colors, CIE XYZ, and the like. The device color space can be CMYK, KGB, and the like. Initial device color values derived from existing color reproduction methods, such as color lookup tables, can be used to generate an initial reference for the device color space.

There can be a penalty error between the target colorimetry and the reference colorimetry. Aspects of the disclosure can describe a method for mapping an input color that can generate a next reference colorimetry that minimizes the penalty error. The subsequent device color values can be searched repeatedly until the penalty error is less than a predetermined value, then the input color elements and the corresponding subsequent device color values can be stored as a refined inverse color lookup table. The refined inverse color lookup table can be stored in a memory of a marking device and used to print images.

A gamut mapper can be included in the disclosed method to map the input colors into new colorimetric values to generate the target colors. Gamut mapping can be performed by clipping or warping the colorimetric subspace to fall within the gamut of a marking device.

A forward printer model can hold the map of the initial device color values to the reference colorimetry space. The initial device color values can be extracted from an initial inverse color lookup table, which can be factory installed or updated.

The penalty error can be defined as a norm of a difference between the target colorimetry values and the reference colorimetry values. The penalty error is minimized by reducing a gradient of the penalty error to a zero vector. The penalty error can be minimized by using a conjugate gradient method.

BRIEF DESCRIPTION OF THE DRAWINGS

The disclosure will be described with reference to the accompanying figures, wherein like numerals represent like elements, and wherein.

EMBODIMENTS

Figure 1:
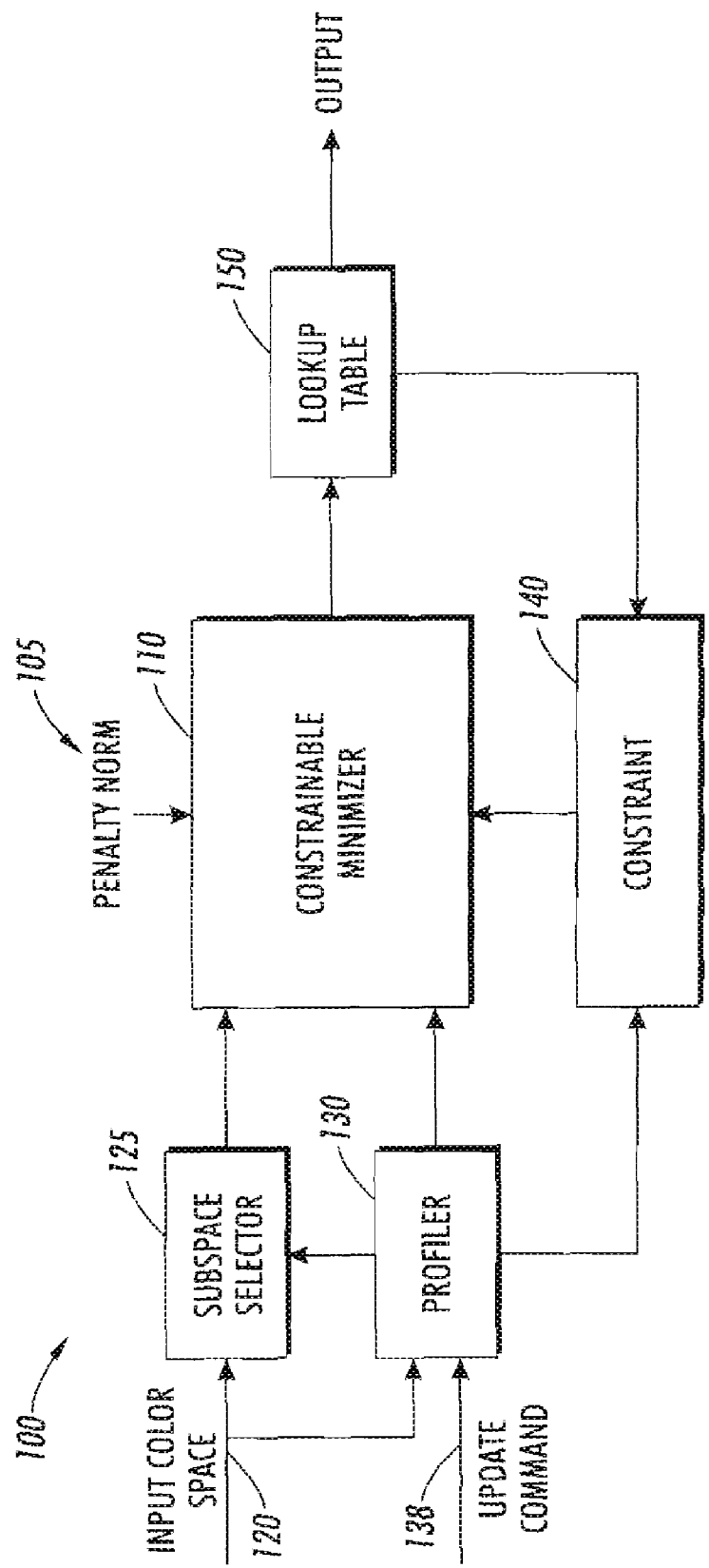
FIG. 1 shows an exemplary high-level drawing of the color reproduction error minimization method and device.

FIG. 1 shows an exemplary embodiment of color reproduction error minimization (CREM) system 100. The CREM system 100 reads data from an input color space, processes the input data along with other stored data, and writes a color map. The input color space can, for example, be either the colorimetric values of spot colors, colorimetric values of grid points in a color lookup table, or colorimetric values either retrieved from a marking device's memory or measured from a marking device's output. The color map can be saved in a lookup table that can accurately transform from desired colorimetric values to corresponding device colorants or device color values.

CREM system 100 can include a subspace selector 125, profiler 130, a constrainable minimizer 110, a constraint 140, and a lookup table 150. Both subspace selector 125 and profiler 130 can receive input from input color space 120. Profiler 130 can receive an update command 138 and constrainable minimizer 110 can receive a penalty norm 105. Lookup table 150 can provide colorimetrically accurate output from CREM system 100 to an external device or system.

Although the signal flow of CREM system 10 in FIG. 1 shows left-to-right overall order, there can be feedback and feedforward paths. The overall signal flow can be from input color space 120 through both subspace selector 125 and profiler 130 through constrainable minimizer 110 through lookup table 150 to an output. Profiler 130 can feed some signals forward to subspace selector 125 and other signals to constraint 140. Constraint 140 can feed a signal forward to constrainable minimizer 110 and can accept a feedback signal from lookup table 150.

The input color space 120 can be any set of colors from any color source. The input color space 120 can be samples from a characterization source, such as the L*a*b* values of a Pantone spot color sample book, or the output of a scanner or a spectro-photometer, or a set of measured L*a*b* values, or the output from an RGB monitor, and the like. The input color space 120 samples can be the measured colorimetry of the output of a CMYK marking device. In other words, the output of a marking device can be fed back to an input of CREM system 100.

Subspace selector 125 can accept elements of input color space 120 and rules for using those elements. The rules can come from profiler 130 and can enforce a marking device's gamut. These rules can reject some portions of the input color space 120, and can either map other portions into a marking device's gamut or onto gamut boundaries.

Subspace selector 125 can select either a proper subset of an input color space or the entire space, clip or warp the selected space, quantize the elements of the selected space, and send the quantized elements to constrainable minimizer 110. In other words, subspace selector 125 can impose gamut boundaries on the input color space and generate a grid of points. The particular gamut that subspace selector 125 selects can be from profiler 130. In an exemplary case, subspace selector 125 can pass all of the elements of input color space 120 to constrainable minimizer 110 and the gamut in profiler 130 can be one of a DC6000 printer or an iGen3 printer.

The subspace selector 125 output can be called target colorimetry or a target colorimetry space. A target colorimetry space can be the colorimetry of a set of desired colors or desired color values. Target colorimetry can be compared with reference colorimetry from profiler 130. Constrainable minimizer 110 can compare the target and reference colorimetry data, reduce colorimetry error between the data sets, and then store an accurate colorimetry-to-device color map in lookup table 150.

Profiler 130 can send the following types of data to constrainable minimizer 110: first, a reference colorimetry dataset and second, a set of starting points for a search of device colors, i.e. device color values. The reference colorimetry from profiler 130 can be part of an original profile, an internally updated profile, or an externally updated profile. The starting points can initialize constrainable minimizer 110's search for device colors to put into the refined map. The refined map does not transform a source color to a colorimetric value, instead, it can transform colorimetric values into marking device colors. The refined map can be stored in lookup table 150 and can produce colorimetrically accurate output from a marking device.

Profiler 130's original, or internally updated, or externally updated profile can hold a forward map and an inverse map. A forward map connects a device color space to a colorimetric space, while an inverse map connects a colorimetric space to a device color space. The inverse map can contain the marking device's gamut implicitly.

An original profile can be stored in profiler 130 following an original or factory calibration of the marking device. An updated profile can be generated in the field by a user or by a technician when the marking device is calibrated using internal measurement equipment. An externally measured profile can be generated using external colorimetry equipment to measure input color space 120 elements and convert the measurements to colorimetric values. In an exemplary case, profiler 130 can be updated from a printer's internal spectrophotometer using hundreds of cyan-magenta-yellow-black (CMYK) sample patches from the printer. K can be called a color separation value.

In an exemplary case, profiler 130 may be an externally measured profile from input color space 120 when Pantone source colors are measured with a laboratory spectro-photometer and converted to CIE L*a*b* colorimetric values. CIE L*a*b* values are colorimetry co-ordinates in a standard color space.

In an exemplary case, profiler 130 may use an International Color Consortium (ICC) profile. When the marking device is a printer, the ICC profile can hold the forward map and the inverse map in the forward printer model and the inverse printer model, respectively. The contents of each model depend on a color rendering intent.

The ICC defines a media-relative colorimetric intent, an ICC-absolute colorimetric intent, a perceptual intent, and a saturation intent. Colorimetric intents preserve in-gamut colors at the expense of out-of-gamut colors. The media-relative colorimetric intent rescales in-gamut values to the white point of the medium. For example, the white point can be 98 for bright white paper, or 94 for standard paper. In an exemplary case, CREM system 100 uses a media-relative colorimetric intent.

An ICC profile can include a destination profile AtoB1 tag and a BtoA1 tag. For printers, the AtoB1 tag and the BtoA1 tag hold the forward printer model and inverse printer model, respectively. The digit 1 in the tag name indicates a media-relative colorimetry intent. The BtoA1 tag can hold gamut constraints implicitly. In other words, the gamut can be built into the BtoA1 tag so the printer can avoid attempts to print out-of-gamut colors.

Constraint 140 can receive constraint data from profiler 130, or lookup table 150, or both and supply a constraint to constrainable minimizer 110. Constraint 140 can receive or supply any number of constraints to constrainable minimizer 110.

In an exemplary case, constraint 140 can ensure that constrainable minimizer 110 achieves a particular gray level in a document. The gray level can be specified by a marking device's gray component replacement (GCR) settings. In other words, constraint 140 can ensure that the gray level of a printed image or document matches the value required by GCR. GCR can specify, for example, a gray level by setting a K separation constraint, thereby saving black colorant in a CMYK printer.

Constraint 140 can take a constraint data input from either profiler 130 or lookup table 150 and may or may not modify the constraint data before sending it to constrainable minimizer 110. In other words, constraint 140 can transform the constraint data using a linear or a non-linear function. In an exemplary case, the transformation may be directly proportional to a K separation supplied by either profiler 130 or lookup table 150. In an embodiment, the transformation may be a monotonic function of a K separation supplied by either profiler 130 or lookup table 150.

Constrainable minimizer 110 can receive a constraint from constraint 140 and a penalty norm 105, input from subspace selector 125 and profiler 130. Constrainable minimizer 110 can search a constrained device color space and store search results in lookup table 150. If no constraint is provided, the entire device color space can be searched. In an exemplary case, CMY plus K together is the entire CMYK device color space.

Constrainable minimizer 110 can search to minimize a penalty function. The search can be based on differences of target colorimetry and reference colorimetry. The target colorimetry can be part of, or all of, the input color space. Subspace selector 125 can determine the selection of input color space elements. The reference colorimetry can be from profiler 130. The penalty function can provide the constrainable minimizer 110 a sense of direction as it searches the device color space.

In an exemplary case, the reference colorimetry can be obtained from the forward printer model in an ICC profile and the target colorimetry can be CIELAB L*a*b* or CIEXYZ values. Both CIELAB and CIEXYZ are standard color spaces.

Constrainable minimizer 110 can use an algorithm to find a minimum of the penalty function. Some suitable minimization algorithms include: Fletcher-Reeve's version of the conjugate gradient method, Polak-Ribiere's version of the conjugate gradient method, a direction set method, Powell's quadratically convergent method, a downhill simplex method, a variable metric method such as Davidson-Fletcher-Powell, a variable metric method such as Broyden-Fletcher-Goldfarb-Shaanon, a linear programming method, and the like. In an exemplary case, the penalty function can be the sum of the squares of differences in target and reference colorimetry data.

The penalty function can be a function of device colors variables, target colorimetry, reference colorimetry and the like. A goal of the minimization algorithm can be to search for the device colors that drive the penalty function to its lowest value for each given target colorimetry value. A gradient may direct the search for a minimum of the penalty function. The gradient can be zero or nearly zero when the minimum is reached. The penalty function can also be called the objective function, or the error penalty.

The penalty norm 105 can determine the type of penalty function. The penalty norm can determine the way error is penalized. For example, the penalty norm 105 can include the L2 norm, which is the mean square error norm. Other penalty norms include L1 which is the absolute value of error, and $L_{infinity}$, the worst-case or maximum error. Penalty norm 105 can prescribe any norm, including L1 to $L_{infinity}$, to constrainable minimizer 110.

In an exemplary case, the penalty function can use an L2 norm, compute squares of differences of target and reference CIELAB L*a*b* values, and the device colors can be all of the C, M, Y, and K components of a CMYK vector or only the C, M, and Y components and K can be a constant. In an embodiment, the penalty function can be computed with an L2 norm for colorimetric values in the CIEXYZ space.

Lookup table 150 can hold a refined colorimetry to device color map produced by constrainable minimizer 110 and can supply constraint data to constraint 140. The lookup table 150 can send the map to the marking device or to external devices or systems. In one embodiment, lookup table 150 can hold a colorimetric space to a device color map that causes a marking device to produce output with lower root mean square (RMS) or worst-case colorimetry error than possible with an ICC BtoA1 tag. When constraint 140 requires constraint data from lookup table 150, the refined map can be searched to locate color peaks, the number of peaks can be counted, the peak device color values can be quantized, and an overall K separation can be calculated from the average of the quantized peak device colors.

To illustrate the CREM system 100, consider the following exemplary case of a CMY printer and the CIELAB colorimetry of its printouts. This exemplary case is illustrative, not limiting. A more general case of CMYK follows directly from this discussion by adding K. The most general case of a marking device, which may or may not be a printer, and a colorimetric space, such as CIELAB, CIEXYZ, and the like, should be understood.

Step 1. Print the entire CMY space. One can take even steps in each dimensions: C, M, and Y. This can be thought of as a 3 dimensional cube made of smaller, identical cubes. Each small cube is an individual color sample of the printer's output.

Step 2. Measure the CIELAB values L*a*b* of all of the individual color samples using a calibrated instrument. All of the measured L*a*b* values are in the printer's color gamut or "in-gamut" by definition since the printer produced them. If the CMY space is printed repeatedly in step 1, the CIELAB measurements can be averaged or smoothed to improve the final colorimetric accuracy. Thus, a measured L*a*b* value can be a single measurement, an average, or a smoothed value from a set of L*a*b* measurements.

Step 3. Put the CMY and CIELAB data in a table. This table can be called the forward printer model. The output of the CMY-to-CIELAB table can be called the printer's true colorimetry or the reference colorimetry.

Step 4. Create a set of L*, a*, b* values. These L*a*b* values can be regularly spaced to constitute a fine grid of the CIELAB space. The grid may need to be fine because the printer may receive a command to print a specific color, such as spot color. The printer has to be ready for any desired color. The desired color's L*a*b* values may not happen to be one of the forward printer model's CIELAB values. That would be a co-incidence.

Step 5. Some samples from the desired L*a*b* grid points may not be in-gamut. If so, a gamut mapping algorithm transforms the out-of-gamut L*a*b* value to an in-gamut target value. There are many gamut mapping algorithms, some of which clip or warp the out-of-gamut space. For the purpose of this discussion, the in-gamut desired L*a*b* values will be moved to another point on the fine L*a*b* grid.

Step 6. For each in-gamut L*a*b* grid point, a search algorithm examines the CIELAB values in the forward printer model to find the best matching measured L*a*b* value or points in its vicinity. The search algorithm can search by selecting a candidate CMY value and looking up the corresponding measured L*a*b* value until an approximate match is found. The candidate CMY value that starts each search can be chosen at random but a carefully selected CMY value can save search time. The search can be fastest when the candidate CMY happens to correspond to the measured L*a*b* value closest to the desired, in-gamut L*a*b* grid point.

If available, a reverse printer model can provide the candidate CMY values. The reverse printer model maps in-gamut CIELAB values to CMY values. The reverse printer model can provide the carefully selected starting points for starting the CIELAB search. The printer model can be built at the printer's factory or by a field technician or end-user.

Step 7. For each CMY starting point, the search algorithm refines the CMY value that minimizes the penalty function. To do this, the search algorithm uses a differentiable model of the measured L*a*b* values. For each printed CMY value of Step 1, the L*a*b* value of the differentiable model can exactly equal the measured L*a*b* value. The penalty function is now a function of the differentiable model's parameters. The differentiable model parameters are C, M, and Y. The parameters are actually independent variables of the penalty function. C, M, and Y are italicized to emphasize their status as independent variables. CMY is a vector of these variables. The search algorithm tests values of CMY to minimize the penalty function then stores the final value as CMY for the given L*a*b* grid point.

In this illustrative case, the penalty function is a function of CMY. So for each L*a*b* grid point, the search algorithm can, if necessary, compute a gradient. The penalty function can be differentiable with respect to C, M, and Y at all possible CMY values so the gradient can be defined. The gradient tells the search algorithm which direction to take to decrease the penalty. Not all search algorithms use the gradient. If used, the gradient can speed the search and improve search accuracy.

Figure 2A:
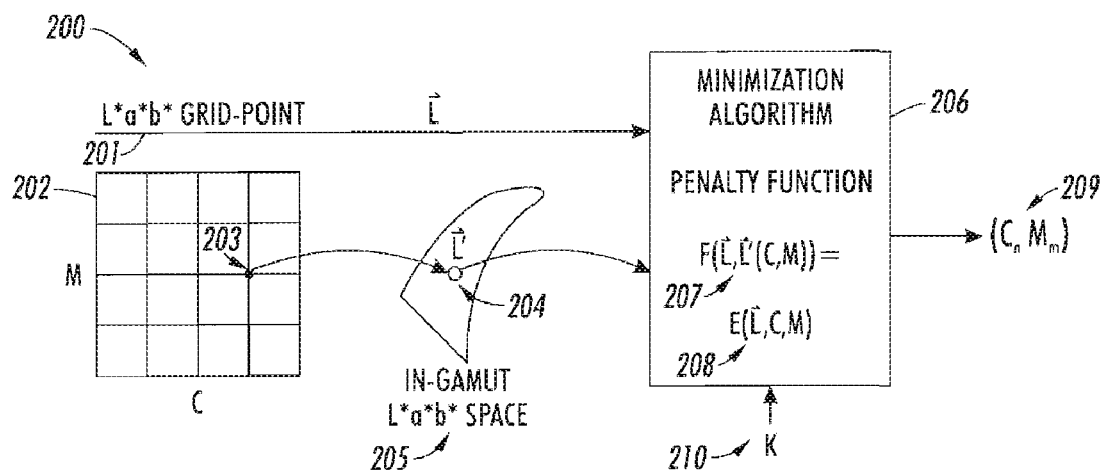
FIG. 2a shows a two dimensional example of the color reproduction error minimization method and device for a target L*a*b* value $\overline{L}$.

FIG. 2a shows a two dimensional example 200 of a mapping from an L*a*b* grid point 201, called, $\overline{L}$ to a $(C_m, M_m)$ value 209. The subscripts indicate that these values of C and M can yield the minimum error penalty. Example 200 shows a two dimensional plot for illustrative purposes, but a full multidimensional example is to be understood in general. In other words, only two components, C and M, are shown in example 200 because of the difficulty representing a function of more than two independent variables in a two dimensional figure. In the case of CMYK, a full example could include either C, M, and Y or C, M, Y, and K.

The device color space 202 maps an element 203 to an element $\overline{L}'$ 204 of the in-gamut L*a*b* space 205. The element $\overline{L}'$ 204, the L*a*b* grid point 201 ($\overline{L}$), and constraint K 210 can provide input to minimization algorithm 206.

The minimization algorithm 205 can be formulated to work with a function F 207 or penalty function E 208 equally. In other words, F 207 shows $\overline{L}'$ explicitly whereas $\overline{L}'$ is implicit in E 208. In either case, the penalty function can be a function of three independent variables and can be constrained by a constraint such as K 210.

Figure 2B:
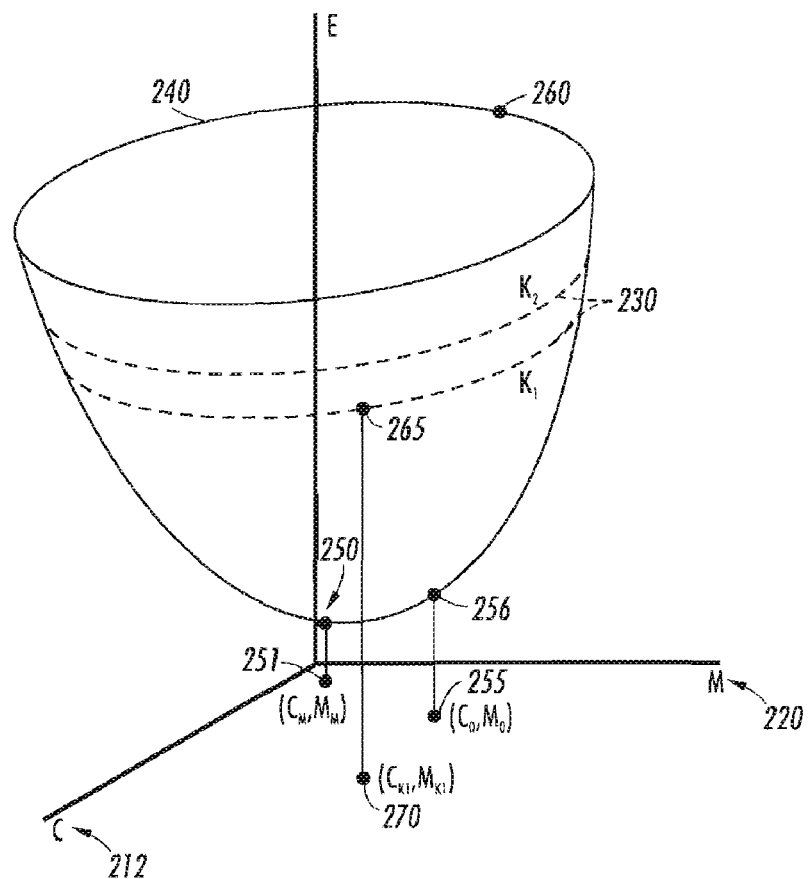
FIG. 2b shows an example plot of a penalty function used with the color reproduction error minimization method and device.

FIG. 2b plots a penalty function 240 versus two independent variables: a C component 212, and an M component 220. The penalty function in this example is also a function of a third independent variable. The third variable is an L*a*b* grid point $\overline{L}$. $\overline{L}$ is fixed and not explicitly shown in this example plot.

The penalty function 240 has a minimum 250 and a maximum 260. The penalty function directs a search to find either $(C_m, M_m)$ 251 or $(C_{K1}, M_{K1})$ 270 that corresponds to minimum 250 or minimum 265 on a contour, respectively.

The contours shown in example 200 can be values of the penalty function 240 for pairs of C component 212 and M component 220 that satisfy a constraint. The constrained (C, M) pairs inscribe a contour on the penalty function 240. For the purpose of illustrating a constraint using this two dimensional example, let K be a radius constraint on (C, K) so that $K=(C^2+M^2)^{1/2}$ is a constant, such as $K_1$ or $K_2$. Example 200 shows contours 230 of the penalty function are labeled $K_1$ and $K_2$. Minimum 265 corresponds to the lowest penalty combination of C and M, $(C_{K1}, M_{K1})$ 270, that satisfies constraint $K_1$.

A particular $(C_0, M_0)$ point 255 may produce a penalty function value 256 as shown. Point 255 may be a starting or initial value used to initialize the minimization algorithm. Similar to the previous discussion, for each given L*a*b* grid point, $\overline{L}$, the starting or initial CM point can be a random value, a value from an original printer model, or an updated printer model.

The minimization algorithm can take the reference colorimetry from profiler 130, compare that with target colorimetry from subspace selector 125, then compute a penalty at each target colorimetry point, and reduce the penalty by adjusting a device color (C, M).

Figure 3:
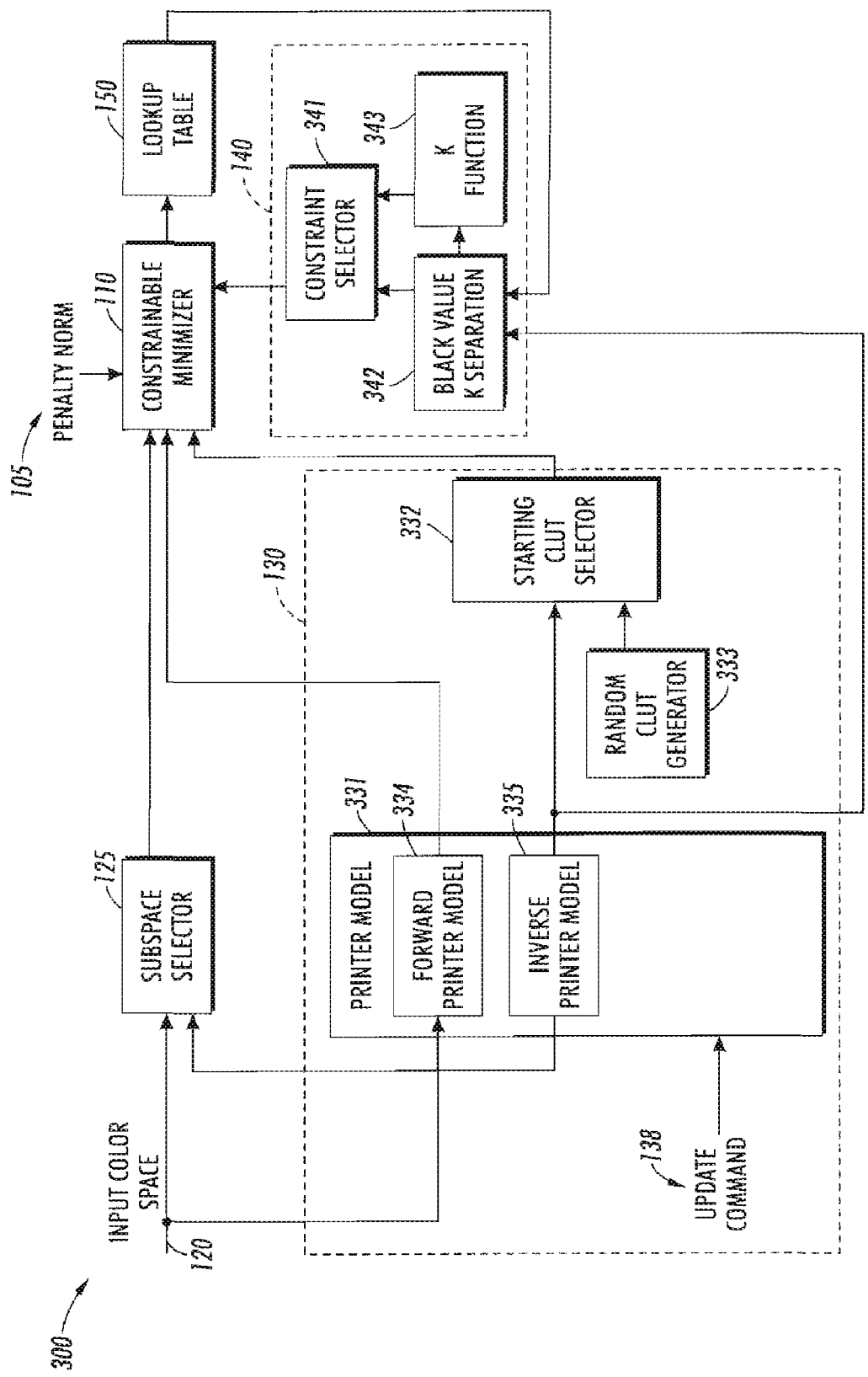
FIG. 3 shows an exemplary detailed drawing of the color reproduction error minimization method and device.

FIG. 3 shows a detailed block diagram of an exemplary device 300. To the extent that FIG. 3 is similar to FIG. 1, the similar description will be omitted. As shown in FIG. 3, profiler 130 can further include a printer model 331, starting CLUT selector 332, and random CLUT generator 333.

Printer model 331 can include a forward printer model 334 and inverse printer model 336. Forward printer model 334 may be updated using values from input color space 120 or updated periodically using built-in characterization routines.

Starting CLUT selector 332 may take its inputs from inverse printer model 336 and random CLUT generator 333 and may provide output to constrainable minimization 110. In an exemplary case, the inverse printer model can implement a CIELAB L*a*b* to CMYK CLUT. In this exemplary case a CMYK value may be used to initialize the constrainable minimizer. In the exemplary case where the forward printer model 334 is based on an ICC specification, then the forward printer model 334 can include a destination profile AtoB1 tag implementing a colorant to colorimetric CLUT and the inverse printer model 336, can include a BtoA1 tag from which colorimetric to colorant CLUT may be obtained.

Constraint 140 may take its inputs from inverse printer model 336 and lookup table 150 and may provide output to constrainable minimization 110. Constraint 140 can include constraint selector 341, black value K separation 342, and K function 343. Both black value K separation 342 and K function 343 may provide input to constraint selector 341. The output of constraint selector 341 may provide input to constrainable minimization 110. An output of lookup table 150 and an output of inverse printer model 336 may provide input to black value K separation 342. Black value K separation 342 may provide input to K function 343. In one embodiment, black value K separation 342 may be proportional to a value that preserves the black ink amounts used by a gray component replacement (GCR) requirement. In another embodiment, output from black value K separation 342 may be processed by a linear or nonlinear function f(K) in K function 343.

In operation, printer model 334 can supply reference colorimetry data for constrainable minimization. The reference colorimetry data can be, for example, a set of L*a*b* values that were printed from a set of CMYK values when the printer was updated during printer characterization. The constrainable minimizer can take a set of target colorimetry values in an output space can search for input space values that minimize a penalty of the difference in target values and a differentiable function of the reference data.

Figure 4:
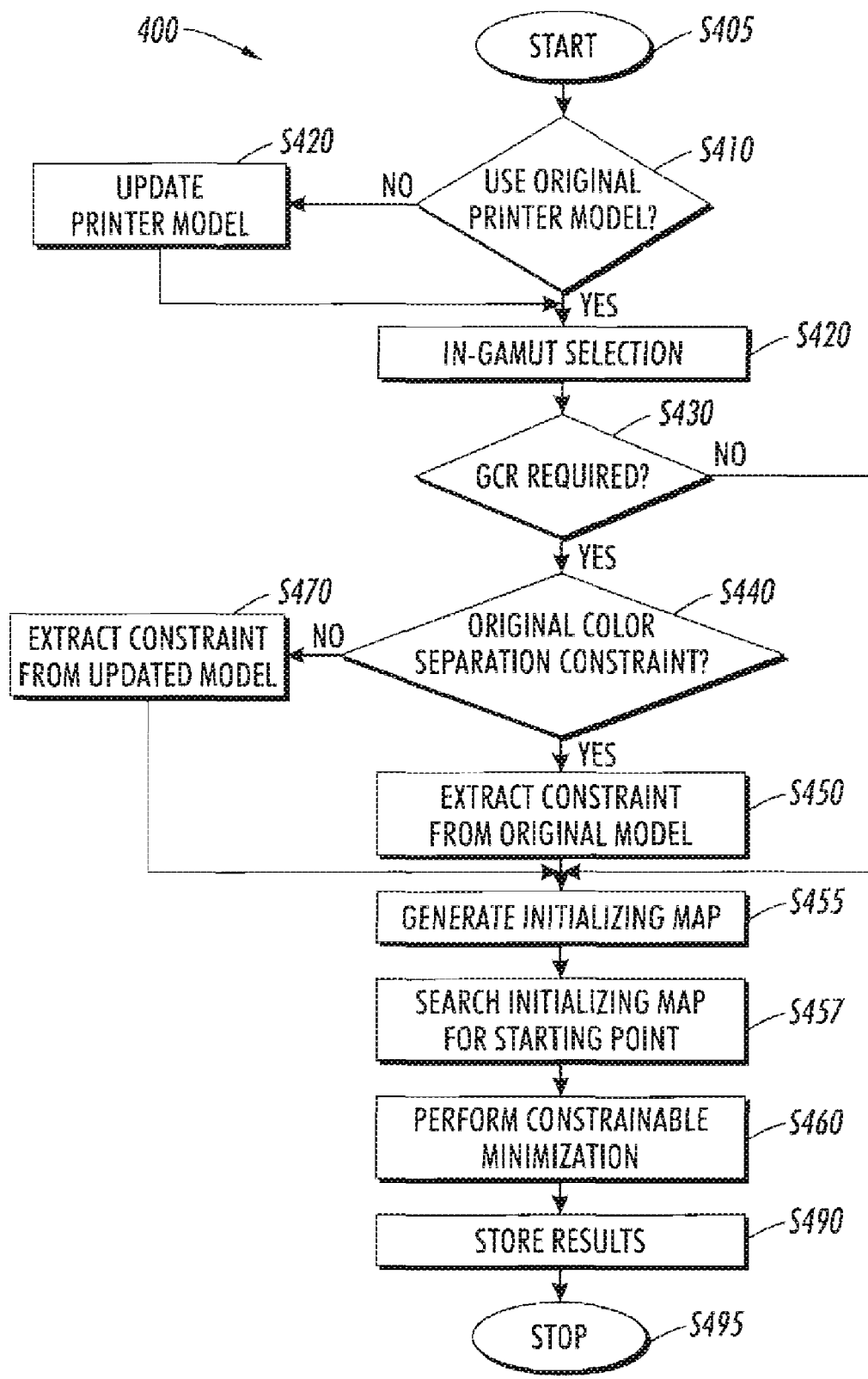
FIG. 4 shows an exemplary flowchart of the color reproduction error minimization method and device.

FIG. 4 shows a flowchart outlining an exemplary process of color reproduction error minimization. To understand how to minimize color errors, it can be helpful to understand the sources of color errors.

Color reproduction errors can have numerous sources. First, when the marking device is a printer, the calibration procedure may print too few samples to characterize the printer's colorant to colorimetry map accurately. In other words, the forward printer model may be too coarsely sampled.

Second, the printer output can vary with time for a given commanded color. In other words, a printer may produce batches of samples that do not have the same colorimetry. These changes can be called printer status shifts and may require the printer model to be updated.

Third, the colorimetry of a sample can vary depending on where on a page it is printed. For example, the paper's brightness may be non-uniform or the paper may be slight textured.

Fourth, when the printer model is updated, the spectrophotometer measurements have spectral power density errors. This fourth error source can apply to either built-in or external scanners or spectro-photometers.

Fifth, as a consequence of the first problem, the printer gamut boundaries may be too coarsely sampled. There may also not be enough room in a table to represent the in-gamut portion of the colorimetric space adequately.

Sixth, when a colorimetric grid is imposed on the colorimetric space, or when a colorimetric measurement of a spot color source is used, the colorimetry does not generally match the colorimetry used to generate the forward printer model.

Seventh, inversion algorithms can significantly magnify other sources of error. This error magnification process can occur, for example, in the inversion algorithms that are used to generate an inverse printer model from a forward printer model. There is an analogy in algebra when matrices have to be inverted. Some matrices are difficult to invert numerically. Such matrices have large condition numbers. A condition number quantifies how nearly singular (nor-invertible) a matrix is.

Program flow may begin at step S405 and proceed to step S410. In step S410 a printer model can be selected. The selection in S410 can be an original printer model or an updated printer model. If an updated printer model is required, program flow can proceed to step S415, otherwise program flow can proceed to S420.

In step S415, a printer can be commanded to produce test samples. For example, the printer can respond to commands to print a set of CMYK values, and the colorimetry of the resulting output can be measured by a built-in or external spectro-photometer and these measurements can be used to update the printer model.

After step S410 or step S415, program flow can continue to step S420 where in-gamut selection can be performed. Step S420 may apply rules that map an input space to a subspace. For example, the subspace selector 120 of FIG. 1 can select a subset of the CIELAB L*a*b* colorimetric values of a set of spot colors. Step S420 may map input values to the interior of an output space or it may map input values to a boundary of an output space. In other words, step S420 may confine the values requested of a printer to fall within its gamut.

After step S420, program flow may proceed to step S430. Step S430 can assess the need for gray component replacement (GCR). If GCR is not required, then the program can proceed to step S455, otherwise the program can proceed to step S440. Step S430 can allow gray values to replace darker colors. In other words, GCR can reduce colorant consumption. In an exemplary case, S430 may be used to conserve black colorant.

When GCR is required, program flow may proceed from step S430 to step S440, otherwise program flow may proceed to step S470. In step S440, a decision may be made to extract a color separation constraint from an original printer model and program flow may proceed to step S450, otherwise program flow may proceed to step S470.

In step S450, a constraint may be extracted from an original printer model. In an exemplary case, the original printer model can be a printer model set at factory calibration.

When the original printer model is not required for a constraint, program flow may proceed from step S440 to step S470. In step S470, the constraint may be extracted from an updated printer model. In an exemplary case, the updated printer model can be a new printer model that may be determined by a printer characterization procedure. In an exemplary case, the new printer model can be a printer model based on measurements of characterization samples. In an exemplary case, the constraint can be a color separation value, K. Program flow may proceed after step S470 to step S455.

After step S450 or step S470, program flow may proceed to generate initializing map S455. The generate initializing map step S455 may be used to establish initial values for mapping an output color space to a device color space. The generate initializing map step may use initialization values from the original printer model or the updated printer model. For example, an initializing map may be taken from a set of L*a*b* colorimetric measurements of printouts of set of CMYK values. In an exemplary case, the initializing map may be stored as an ICC BtoA1 tag color lookup table (CLUT).

After step S455, program flow may proceed to step S457 in which the initializing map may be searched for starting points. For example, a starting point may be taken from the BtoA1 tag CLUT value with the smallest Euclidean distance from an L*a*b* value for which a constrainable minimization will be performed. After step S457, program flow may proceed to step S460.

Step S460 may perform a constrainable minimization calculation starting with an initial value generated in step S455. Minimization algorithms for S460 may include: Fletcher-Reeve's version of the conjugate gradient method, Polak-Ribiere's version of the conjugate gradient methods a direction set method, Powell's quadratically convergent method, a downhill simplex method, a variable metric method such as Davidson-Fletcher-Powell, a variable metric method such as Broyden-Fletcher-Goldfarb-Shannon, or a linear programming method. In one exemplary case, a table of CMYK may be computed in step S460. For example, with reference to the two dimensional example in FIG. 2, in step S460, the contours of constant K value 230 ($K_1$ and $K_2$) may apply. For this example, a final (C, M) value shown as ($C_m, Y_m$) 251 may be found for which the value of the penalty function 240 reaches a minimum 250. For this exemplary case, the value of ($C_{K1}, Y_{K1}$) may be constrained by a K value equal to $K_1$ from either step S450 or step S470.

Step S460 may implement minimization algorithms without a constraint. In an exemplary case, step S460 can implement a conjugate gradient minimization algorithm without a K value constraint.

After step S460, program flow may proceed to step S490 and store results. In an exemplary case, program output from step S490 can be a table of values for a lookup table that can supplant the BtoA1 tag of the ICC inverse printer model and produce allow colorimetric to colorant mapping with colorimetric error that is low compared with human perceptual thresholds. Program output from step S490 may, for example, be stored in non-volatile flash memory. In an exemplary case, program output from step S490 may be stored in lookup table 150. After step S490, program flow may proceed to step S495, whereupon program flow may stop.

Figure 5:
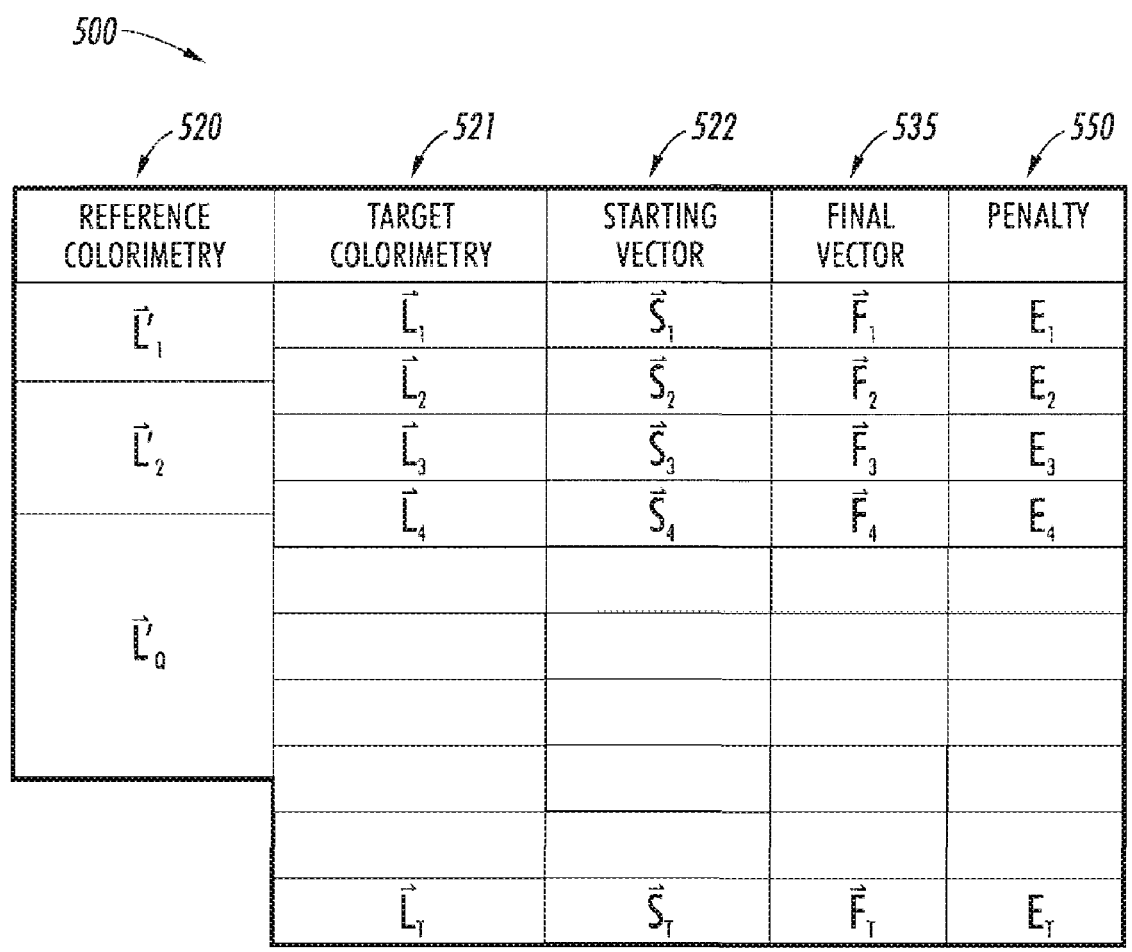
FIG. 5 shows an exemplary data structure of the color reproduction error minimization method and device.

FIG. 5 shows an exemplary data structure 510 that can include reference colorimetry 520, target colorimetry 521, starting vector 522, final vector 535, and penalty 550. An underscore in a quantity such as reference colorimetry 520 can be used to denote a vector quantity, for example $\underline{\Gamma}$. Likewise the target colorimetry vector 521, starting vector 522, and the final vector 535, may be denoted by $\underline{\Gamma}, \underline{S}$, and $\underline{F}$, respectively. The penalty 550 may be a scalar denoted E.

To assist in making the data structure clear:

$\vec{C}'$ is the colorimetry output of a device color to colorimetry map. $\vec{C}'$ represents the true, measured colorimetry of the marking device output. $\vec{C}'$ can be called the reference colorimetry.

$\vec{C}$ is a target colorimetry value. In other words, the colorimetry values that will constitute the input of an accurate colorimetry to device color map produced by CREM system 100.

$\vec{S}$ is a starting vector. For example, it is $(C_O, M_O)$ 255 in FIG. 2b.

$\vec{F}$ is a final vector. It will constitute the output of an accurate colorimetry to device color map produced by CREM system 100, For example, it is either $(C_m, M_m)$ 251 or $(C_{K1}, M_{K1})$ 270 in FIG. 2b.

E is the minimum value of the penalty function. The minimum penalty occurs at the device color the constrained minimizer finds. For the example of FIG. 2b, this minimum value occurs when the penalty function is evaluated at either the device color $(C_m, M_m)$ 251 or $(C_{K1}, M_{K1})$ 270, if the minimization problem is unconstrained or constrained, respectively.

Data structure 510 may be organized so columns represent a data set and, where aligned, each row can associate the fields of each row. The number of rows of each column that are not aligned can differ. The contents of the fields of each column may be subscripted by an in-column row number to indicate that association as shown in FIG. 5. For example, one column can be subscripted from 1 to Q and other columns can be subscripted from 1 to T. In other words, Q can represent the number of reference points taken from a forward printer model and T can represent the total number of entries in lookup table 150.

Reference colorimetry 520 can store reference data taken from colorimeter measurements of an input color space 120. The colorimeter measurements can be, for example, spot colors or the printer output used to create an ICC compliant forward printer model, such as printer model 334. Target colorimetry vector 621 can be taken from a subspace of a colorimetric space. For example, a single spot colors can be chosen and CREM system 100 can generate more accurate printouts of the selected spot color. In general, target colorimetry vector 521 can be a different set of colorimetric values than reference colorimetry 520. In an exemplary case, target colorimetry vector 521 can be a much larger set of elements of a colorimetric space than the set used to determine a forward printer model and an inverse printer model. In other words, target colorimetry 521 can establish a high resolution grid of a colorimetric space or it can be used to update spot colors or a single spot color.

Starting vector 522 may be taken from starting CLUT selector 332. The results of constrainable minimizer 110 may be stored in final vector 535. The results stored in final vector 535 can be stored in lookup table 150.

Penalty 550 may be populated with a calculation of the penalty at a target colorimetry vector 521 given the set of reference colorimetry vectors 520. In an exemplary case, the norm used for penalty 550 may be an L2 norm, i.e. the square of the colorimetric space distance between the reference colorimetry 520 and the target colorimetry 521 when final vector 535. As describe previously, alternative embodiments may use other norms such as an absolute difference norm, $L_1$, or a worst-case norm, $L_{infinity}$.

A series of experiments was performed to test the color reproduction error minimization method. The experiments used the exemplary CREM system 100 on four different digital color printers. These four printers were: a DC8000 and Igen3, a DC6000, a DC250, and a DC2000. The input color space was a set of CIELAB L*a*b* measurements of 1122 Pantone colors. The conjugate gradient algorithm was used to search CMYK values to minimize the colorimetry error in the output of each printer. The conjugate gradient algorithm was constrained to so black colorant amounts were preserved. In other words, gray component replacement (GCR) requirements were met.

TABLE 1

Color reproduction error comparison for ICC profiles and color reproduction error minimization method for a DC6000 printer.

| | All Input colors | | Input colors in Gamut | | Input colors out of Gamut | | Number out of |
|---|---|---|---|---|---|---|---|
| | Mean | Max | Mean | Max | Mean | Max | Gamut |
| ICC Profile | 4.12 | 20.2 | 2.63 | 16.43 | 7.89 | 20.15 | 317 |
| Error Minimization Method | 1.69 | 16.9 | 0.16 | 0.30 | 5.55 | 16.94 | 317 |

Table 1 contrasts the color reproduction accuracy obtained from two different color reproduction methods. Table 1 shows the mean and maximum error performance by a DC6000 printer using the ICC profile versus the performance obtained by using CREM system 100. Table 2 shows the same comparison and conditions for an Igen3 printer.

TABLE 2

Color reproduction error comparison for ICC profiles and color reproduction error minimization method for an iGen3 printer.

| | All Input colors | | Input colors in Gamut | | Input colors out of Gamut | | Number out of |
|---|---|---|---|---|---|---|---|
| | Mean | Max | Mean | Max | Mean | Max | Gamut |
| ICC Profile | 4.74 | 18.0 | 3.72 | 8.08 | 7.70 | 17.98 | 286 |
| Error Minimization Method | 1.43 | 16.1 | 0.13 | 0.30 | 5.23 | 16.10 | 286 |

Tables 1 and 2 show the colorimetric error, defined as $\Delta E$, in CIELAB L*a*b* space, obtained with the two methods for the two different printers. Both Table 1 and Table 2 show the CREM system 100 can improve the accuracy for source color reproductions from a DC6000 or an IGen3 printer. The improvement in source color accuracy was obtained both within and outside of each printer's gamut. In other words, Tables 1 and 2 show that both the mean and maximum error is lower for CREM system 100 versus an ICC profile regardless of whether one considers all samples, or in-gamut sample only, or out-of gamut samples only.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for mapping a colorimetry color space to an input color space for an image forming device, the method comprising:

(i) determining target colorimetry values defining a target colorimetry space;

(ii) forming, by the image forming device, output colors from initial device color values, (iii) measuring the output colors to produce corresponding initial reference colorimetry values of an initial reference colorimetry space based on the initial device color values, the initial reference colorimetry values and the initial device color values defining a forward model of the image forming device;

(iv) determining a penalty error between the target colorimetry values and the reference colorimetry values based on a penalty function, the penalty function being a function of a plurality of variables, the plurality of variables including at least one of C, M, and Y;

(v) selecting subsequent device color values to generate refined reference colorimetry values from the forward model that minimizes the penalty error;

(vi) constraining the penalty function by constraining selected subsequent device color values to generate constrained subsequent device color values that satisfy a color separation constraint, the constrained subsequent device color values inscribing a contour on the penalty function, wherein the color separating constraint is a radius constraint and defined by K, where $K=(C^2+M^2+Y^2)^{(1/2)}$;

(vii) repeating steps (iv) to (vi) until the penalty error is less than a predetermined value; and (viii) storing in memory the target colorimetry values of the target colorimetry space in association with the corresponding most recent device color values.

2. The method according to claim 1, further comprising:
selecting the initial device color values such that the initial device color values form a grid over an input gamut of the image forming device.

3. The method according to claim 1,
wherein the stored association of the target colorimetry values of the target color space with the corresponding most recent device color values comprises a refined inverse printer model for the image forming device.

4. The method according to claim 3, further comprising:
using the refined inverse printer model to print images on the image forming device.

5. The method according to claim 1, wherein determining the target colorimetry values to generate the target colorimetry space comprises:
gamut mapping the input color space to a colorimetric subspace to generate the target colorimetry space.

6. The method according to claim 5, wherein gamut mapping the input color space restricts elements of the input color space to elements of the colorimetric subspace to generate the target colorimetry space.

7. The method according to claim 6, wherein gamut mapping includes at least one of a clipping method and a warping method.

8. The method according to claim 1, wherein the target colorimetry space is an in gamut color space of the image forming device.

9. The method according to claim 1, wherein the forward model maps the initial device color values to the reference colorimetry space.

10. The method according to claim 1, wherein the initial device color values are generated from an initial inverse printer model.

11. The method according to claim 10, wherein the initial inverse printer model is at least one of factory installed and later updated inverse printer model.

12. The method according to claim 1, wherein the penalty error is a difference between the target colorimetry values and the reference colorimetry values.

13. The method according to claim 1, wherein the penalty error is minimized by reducing a magnitude of a gradient of the penalty error to zero.

14. The method according to claim 1, wherein the penalty error is minimized by using a conjugate gradient method.

15. The method according to claim 1, wherein the input color space includes at least one of a set of spot colors, CIE L*a*b* colors, and CIE XYZ colors.

16. A device for mapping a colorimetry color space to an input color space of an image forming apparatus, the device comprising:
a selector that selects target colorimetry values of a target colorimetry space;

a profiler that generates initial reference colorimetry values of an initial reference colorimetry space based on measurements of output colors formed by the image forming apparatus from initial device color values, the initial reference colorimetry values and the initial device color values defining a forward model of the image forming apparatus;

a minimizer that (i) determines a penalty error between the target colorimetry values of the target colorimetry space and the reference colorimetry values of the reference colorimetry space based on a penalty function, the penalty function being a function of a plurality of variables, the plurality of variables including at least one of C, M, and Y, (ii) selects subsequent device color values to generate next reference colorimetry values from the forward model that minimize the penalty error, and (iii) stores the target colorimetry values of the target colorimetry space in association with the corresponding most recent device color values; and constrainable minimizer that constrains the penalty function by constraining selected subsequent device color values to generate constrained subsequent device color values that satisfy a color separation constraint, the constrained subsequent device color values inscribing a contour on the penalty function, wherein the color separating constraint is a radius constraint and defined by K, where $K=(C^2+M^2+Y^2)^{(1/2)}$, wherein the profiler, the minimizer and the constrainable minimizer are configured to repeat the selection of subsequent device color values, constraining of the penalty function, generation of the next reference colorimetry values, and determination of the penalty error until the penalty error is less than a predetermined value.

17. The device according to claim 16, wherein:
the selector imposes the image forming device's gamut on the input color space to generate the target colorimetry values; and the profiler stores an inverse printer model that supplies the image forming apparatus' gamut to the selector and initial image device colors to the minimizer.

18. The device according to claim 17 further comprising:
a memory that holds a lookup table of the input color space to refined device colors.

19. The device according to claim 17, further comprising:
a starting selector that selects an initial device color value that is one of a random device color and a device color from an inverse printer model.

20. The device according to claim 17,
wherein the selector gamut maps the input color space by restricting elements of the input color space to elements of a colorimetric subspace to generate the target colorimetry space.

21. The device according to claim 16, wherein the minimizer generates the penalty error as a difference between the target colorimetry values and the reference colorimetry values.

22. The device according to claim 16, wherein the minimizer minimizes the penalty error by reducing a magnitude of a gradient of the penalty error to zero.

23. A printer that maps a colorimetry space to an input color space comprising:
a selector that selects target colorimetry values to generate a target colorimetry space;
a profiler that generates initial reference colorimetry values of an initial reference colorimetry space from measurements of output colors formed by the printer from initial device color values, the initial reference colorimetry values and the initial device color values defining a forward model of the printer;
a minimizer that (i) determines a penalty error between the target colorimetry values of the target colorimetry space and the reference colorimetry values of the reference colorimetry space based on a penalty function, the penalty function being a function of a plurality of variables, the plurality of variables including at least one of C, M, and Y, (ii) selects subsequent device color values to generate refined reference colorimetry values based on the forward model that minimizes the penalty error, and (iii) stores the target colorimetry values of the target colorimetry space in association with the corresponding most recent device color values; and
constrainable minimizer that constrains the penalty function by constraining selected subsequent device color values to generate constrained subsequent device color values that satisfy a color separation constraint, the constrained subsequent device color values inscribing a contour on the penalty function, wherein the color separating constraint is a radius constraint and defined by K, where $K=(C^2+M^2+Y^2)^{(1/2)}$,
wherein the profiler, the minimizer and the constrainable minimizer are configured to repeat selection of subsequent device color values, constraining of the penalty function, generation of the refined reference colorimetry values, and determination of the penalty error until the penalty error is less than a predetermined value.

* * * * *